United States Patent
Pollack et al.

(10) Patent No.: US 10,588,170 B2
(45) Date of Patent: Mar. 10, 2020

(54) SUSPENDED BASEBAND STATE

(71) Applicant: Apple Inc., Cupertino, CA (US)

(72) Inventors: Daniel B. Pollack, San Francisco, CA (US); Venkateswara Rao Manepalli, Sunnyvale, CA (US); Yu Xing, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 87 days.

(21) Appl. No.: 15/702,978

(22) Filed: Sep. 13, 2017

(65) Prior Publication Data

US 2018/0352587 A1 Dec. 6, 2018

Related U.S. Application Data

(60) Provisional application No. 62/514,081, filed on Jun. 2, 2017.

(51) Int. Cl.

| | |
|---|---|
| *H04W 76/25* | (2018.01) |
| *H04W 72/08* | (2009.01) |
| *H04B 17/318* | (2015.01) |
| *H04L 29/08* | (2006.01) |
| *H04W 76/19* | (2018.01) |
| *H04L 29/06* | (2006.01) |
| *H04L 12/26* | (2006.01) |

(52) U.S. Cl.
CPC .......... *H04W 76/25* (2018.02); *H04B 17/318* (2015.01); *H04L 67/145* (2013.01); *H04L 67/26* (2013.01); *H04L 69/16* (2013.01); *H04W 72/085* (2013.01); *H04W 76/19* (2018.02); *H04L 43/16* (2013.01)

(58) Field of Classification Search
CPC ..... H04B 17/318; H04L 43/16; H04L 67/145; H04L 67/26; H04W 72/085; H04W 76/19; H04W 76/25
See application file for complete search history.

(56) References Cited

U.S. PATENT DOCUMENTS

| | | | |
|---|---|---|---|
| 2008/0261630 A1 | 10/2008 | Wormald et al. | |
| 2009/0262686 A1* | 10/2009 | Ebata ............... | H04W 76/38 370/328 |
| 2010/0069127 A1* | 3/2010 | Fiennes ............ | H04W 52/028 455/574 |
| 2010/0097925 A1* | 4/2010 | Bell ................. | H04L 45/00 370/219 |

(Continued)

*Primary Examiner* — Gil H. Lee
(74) *Attorney, Agent, or Firm* — Kowert Hood Munyon Rankin and Goetzel PC; Jeffrey C. Hood; Luke S. Langsjoen

(57) ABSTRACT

A user equipment (UE) device and associated methods for entering a suspended baseband state in response to a signal strength indicator falling below a threshold. A UE engages in an active connection with a remote server, which may be a transmission control protocol (TCP) push connection. A baseband layer of the UE determines that the signal strength indicator has fallen below a threshold, and transmits a notification to an application layer of the UE to suspend the connection. The baseband layer may later determine that the signal strength has risen above a second threshold, whereby the UE may resume the suspended connection. The UE may maintain state information associated with the connection during the suspended state, such that the UE may resume the suspended connection without reestablishing a new connection with the remote server.

20 Claims, 4 Drawing Sheets

(56) References Cited

U.S. PATENT DOCUMENTS

| | | | |
|---|---|---|---|
| 2011/0103305 A1 | 5/2011 | Ali et al. | |
| 2011/0145323 A1 | 6/2011 | Kahn et al. | |
| 2013/0138799 A1* | 5/2013 | Sanchez Velez | G06F 1/3209 709/224 |
| 2014/0215236 A1* | 7/2014 | Heinrich | G06F 1/329 713/320 |
| 2014/0357293 A1* | 12/2014 | Tsaur | H04W 64/00 455/456.1 |
| 2015/0156133 A1* | 6/2015 | Leitch | H04L 47/70 709/219 |
| 2015/0172941 A1 | 6/2015 | Agarwal et al. | |
| 2016/0021623 A1* | 1/2016 | Guo | H04W 52/247 370/329 |
| 2016/0143087 A1* | 5/2016 | Nam | H04L 43/16 455/422.1 |
| 2017/0208134 A1* | 7/2017 | Grauch | H04L 67/145 |
| 2017/0280487 A1* | 9/2017 | Price | H04B 17/318 |

* cited by examiner

SUSPENDED BASEBAND STATE

PRIORITY CLAIM

This application claims priority to U.S. provisional patent application Ser. No. 62/514,081, entitled "Suspended Baseband State," filed Jun. 2, 2017, which is hereby incorporated by reference in its entirety as though fully and completely set forth herein.

FIELD

The present application relates to wireless devices, including a system and method for entering a suspended baseband state during a wireless communication session.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, and others.

Electronic devices may communicate using a push message service. Push message services typically include a push server (or push servers) that can use a network connection (e.g., an internet protocol (IP) network connection, herein referred to as a 'push connection') that is maintained between the electronic device and the push server to send push messages from the push server to the electronic device or to receive push messages (sometimes called "reverse" push messages) sent from the electronic device to the server. Push messages can include graphics, sounds, and/or text, and can be used to deliver various messages to electronic devices, e.g., news, stock quotes, weather forecasts, text messages, and/or notification of events such as email arrival.

Establishing the push connection between the electronic device and the push server may require significant resources. If the electronic device experiences a weak signal which causes it to periodically lose its connection to the push server, repeatedly establishing and tearing down a push connection may result in excessive resource drain and a negative user experience. Improvements in the field are therefore desirable.

SUMMARY

Embodiments are presented herein of, inter alia, methods for gracefully terminating a push connection to minimize complexity of reestablishing a handshake and connection, and of devices configured to implement the methods.

In some embodiments, a user equipment device (UE) engages in an active connection with a remote server. The UE may determine, by a baseband layer of the UE, that a signal strength indicator has fallen below a first threshold. The UE may transmit, by the baseband layer to an application layer of the UE, a notification to suspend the connection.

The UE may determine, by the baseband layer, that the signal strength indicator has risen above a second threshold. The UE may resume the connection in response to the determination that the signal strength indicator has risen above the second threshold.

Resuming the connection may comprise sending a keep alive message to the remote server. In some embodiments, resuming the connection comprises resuming communications with the remote server without reestablishing the connection.

While the connection is suspended, the application may be configured to suspend one or more of: sending messages to buffers for transmission, retransmitting failed transmissions, transmitting keep alive signaling to the remote server, transmitting filter updates to the remote server, and transmitting token requests to the remote server. In some embodiments, the connection is a transmission control protocol (TCP) push connection.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
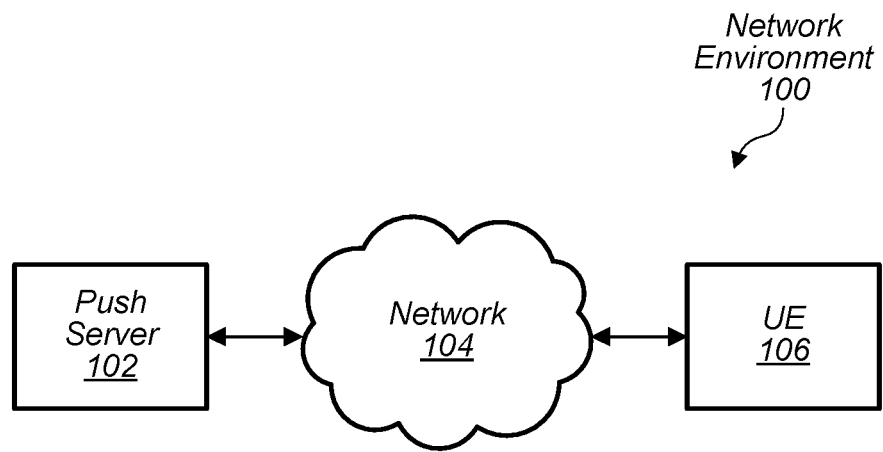
FIG. 1 illustrates an exemplary (and simplified) wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™), laptops, wearable devices (e.g., smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while BLUETOOTH™ channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

FIG. 1—Wireless Network Environment

FIG. 1 presents a block diagram illustrating a network environment 100 in accordance with the described embodiments. As can be seen in FIG. 1, push server 102 and electronic device 106 are communicatively coupled to network 104. The electronic device 106 may be a user equipment (UE) device, which may be a device with cellular and/or WiFi communication capability such as a mobile phone, a smart phone, a handheld device, a wearable device, a computer or a tablet, or virtually any type of wireless device with network communication capabilities.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) or ASIC (application specific integrated circuit) that is configured to perform any of the method embodiments described herein, or any portion of any of the method embodiments described herein.

The UE 106 may include one or more antennas for communicating using one or more wireless communication protocols or technologies. In some embodiments, the UE 106 might be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

Note that a UE 106 may be capable of communicating using multiple wireless communication standards. For example, a UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (WCDMA, TD-SCDMA), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

In some embodiments, the UE 106 may include separate (and possibly multiple) transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and BLUETOOTH™. Other configurations are also possible.

In the described embodiments, the UE may establish one or more push connections, wherein it may send (reverse) push messages to and receive push messages from the push server 102 when using a push message service. Generally, push messages can include graphics, sounds, and/or text, and can be used to deliver messages and receive messages, e.g., news, stock quotes, weather forecasts, text messages, and/or notification of events such as email arrival or plays in an online game. An electronic device can receive a push message from the push server 102 and perform a corresponding action (e.g., display information/a message to a user, start/notify an application, etc.) and/or can send a (reverse) push message to the server for delivery to another electronic device (e.g., send a text message to a user of another electronic device, send a calendar update to a calendar application on a remote server, etc.).

The push server 102 may be connected through a wide-area network (WAN) (e.g., the Internet or another WAN) to a cellular network, and the UE 106 may be connected to the cellular network. In these embodiments, a cellular provider may have configured network hardware (routers, switches, processors, etc.) for establishing and maintaining push connections.

Network 104 may be any network or combination of networks that enables communication of data (data packets, control packets, etc.) between devices coupled (communicatively) to network 104, including the communication of push messages and acknowledgement messages associated with a push message service. For example, network 104 can include any/all of a cellular network (e.g., EDGE, UMTS, HSDPA, LTE, etc.), a network based on the standards described in IEEE 802.11 (e.g., an 802.11 wireless network), an optical network, an Ethernet network, a wired telephone network, and/or other types or combinations of wired and/or wireless networks. In some embodiments, network 104 at least in part includes the Internet, a wide area network (WAN), a corporate or governmental intranet, and/or another larger network.

In some embodiments, network 104 includes a cellular network that is coupled through the Internet to push server 102 (e.g., network 104 includes a combination of cellular network and Internet links), with UE 106 coupled to the cellular network, e.g., via a cellular data connection. UE 106 can use any/all of the techniques described herein to manage its connection (or link) to push server 102, e.g., when the reliability of its connectivity to network 104 becomes less reliable.

Figure 2:
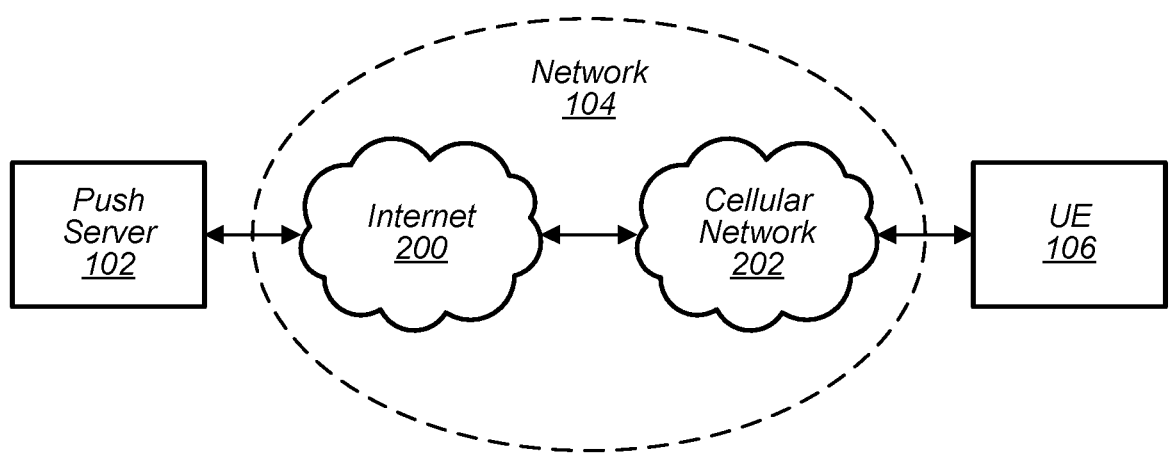
FIG. 2 illustrates an exemplary (and simplified) wireless communication system wherein a cellular network communicates with a push server through the internet, according to some embodiments.

FIG. 2 presents a block diagram illustrating this embodiment of network 104 where network 104 includes Internet 200 and cellular network 202 in accordance with the described embodiments.

In some embodiments, the network hardware (e.g., switches, routers, memories/queues/buffers, network processors, controllers, etc.) in cellular network 202 is located at least partially in one or more cellular traffic routing/control mechanisms in cellular network 202. For example, cellular network 202 can include, but is not limited to, a base station controller (BSC), a base station subsystem (BSS), a mobile switching center (MSC), a network station subsystem (NSS), one or more cell towers including antennas and processing hardware, and/or other routing/control mechanisms, and any or all of these routing/control mechanisms can relay data transmissions between the UE 106 and push server according to embodiments described herein. UE 106 can use any/all of the techniques described herein to manage its connection (or link) to push server 102, e.g., when the reliability of its connectivity to cellular network 202 becomes less reliable.

Although this arrangement of network 104 is presented as an example, in alternative embodiments, network 104 can include other types or arrangements of networks. Additionally, in some embodiments, the network hardware can be located on the Internet 200, or can be located in both the cellular network 202 and the Internet 200.

In some embodiments, the push server 102 is an electronic device such as a server, a server blade mounted in a rack system, or a desktop computer, or some combination of devices. In some embodiments, push server 102 includes components similar to that described below for the UE 106. However, push server 102 may also comprise different numbers or types of components.

Figure 3:
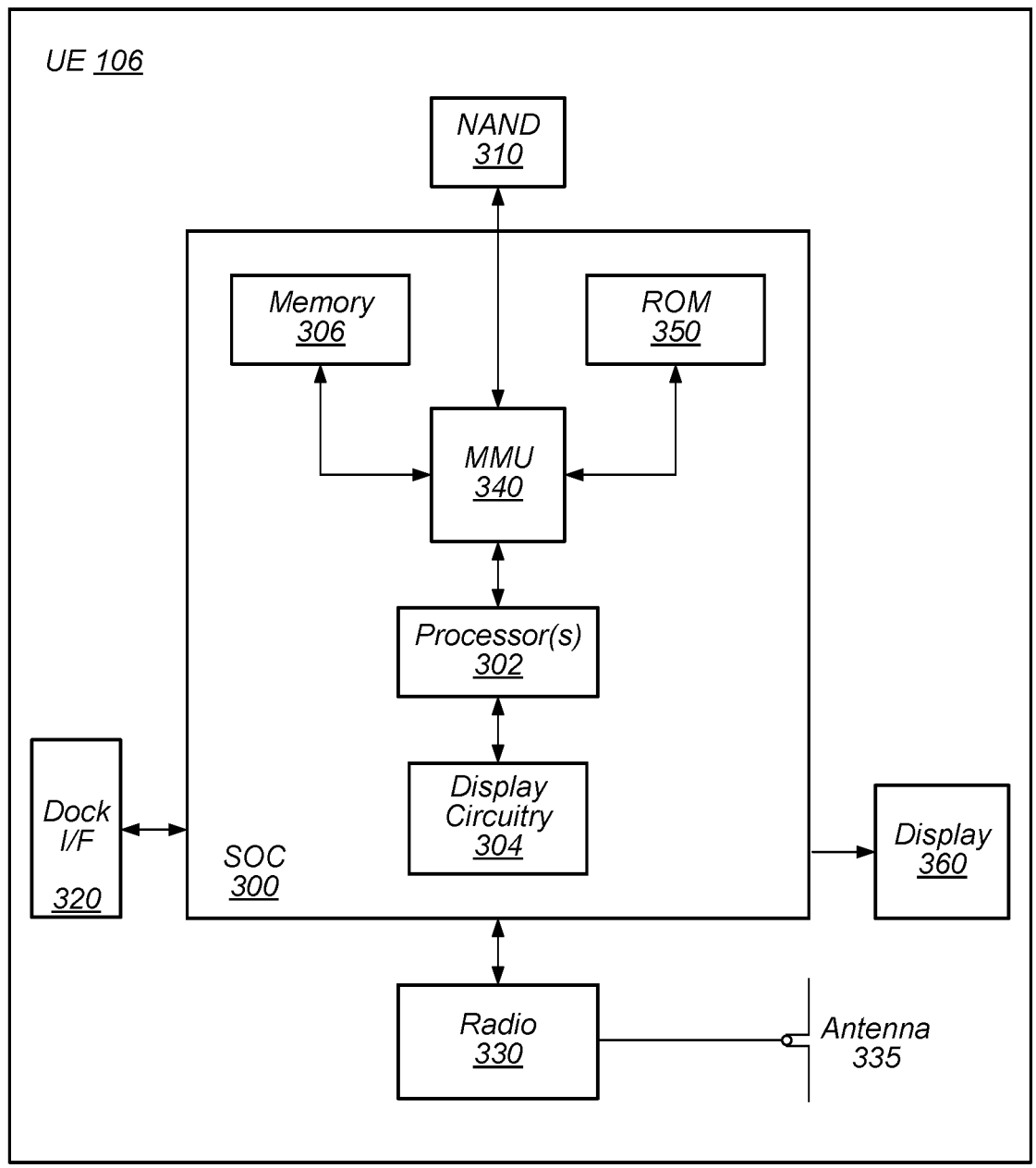
FIG. 3 illustrates an exemplary block diagram of a UE, according to some embodiments.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 that may execute program instructions for the UE 106 and display circuitry 304 that may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry (e.g., radio) 330 (e.g., for LTE, Wi-Fi, GPS, etc.).

The UE device 106 may include at least one antenna (and possibly multiple antennas, e.g., for MIMO and/or for implementing different wireless communication technologies, among various possibilities) for performing wireless communication with base stations and/or other devices. For example, the UE device 106 may use antenna(s) 335 to perform the wireless communication. As noted above, the UE 106 may be configured to communicate wirelessly using multiple wireless communication technologies in some embodiments.

As described further subsequently herein, the UE 106 may include hardware and software components for implementing features for a suspended baseband state, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 6.

Operating System and Push Service Daemon

Figure 4:
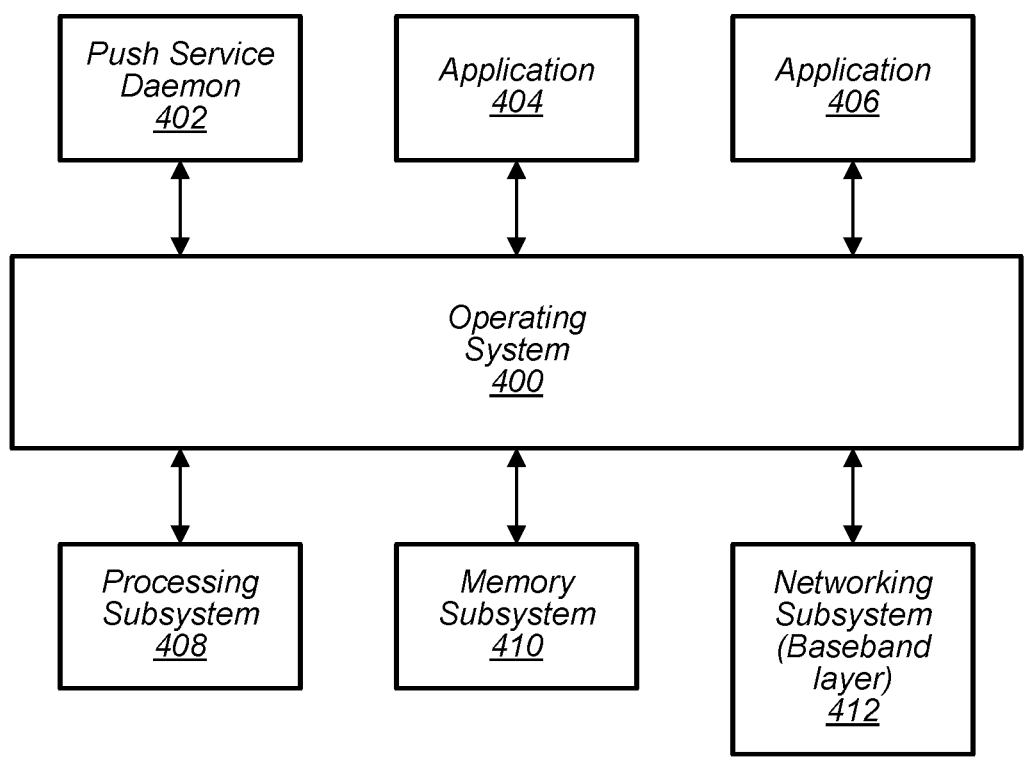
FIG. 4 presents an exemplary block diagram illustrating an operating system and a set of applications, according to some embodiments.

FIG. 4 presents a block diagram illustrating an operating system 400 in accordance with the described embodiments. In some embodiments, operating system 400 is stored (as program code) in a memory subsystem 410. For example, the memory subsystem may include the MMU 340, memory 306, and/or ROM 350 of the UE 106. The operating system may be executed by a processing subsystem 408 including a processor(s) 302 in UE 106. The operating system 400 may be coupled to a networking subsystem 412 that may include the radio 330 and antenna 335. The networking subsystem 412 is referred to herein as the baseband (BB) layer of the UE 106, which may be executed by a baseband processor included within a radio of the subsystem 412.

Operating system 400 serves as an intermediary between system hardware in UE 106 and applications and daemons executed by the processor(s) 302, such as applications 404 and 406 (which may be, as one example, an instant messaging application and a game application) and push service daemon 402. The combination of the processor(s) 302 and the applications and daemons executed by the processor(s) 302 is collectively referred to herein as the "application layer", and the processor(s) 302 are referred to herein as "application processors". The application layer may be operatively coupled to the baseband layer (e.g., through the operating system 400). The push service daemon 402 may be configured to establish and operate one or more push connections. For example, the push service daemon may be configured to operate according to any of the methods described in the present disclosure. Operating system 400 can be, but is not limited to being, the iOS, macOS, or watchOS operating system from Apple Inc. of Cupertino, Calif.; the FreeBSD operating system from The FreeBSD Foundation of Boulder, Colo.; or another operating system. Operating systems and their general functions are known in the art and hence are not described in detail.

Push Message Service

In the described embodiments, the push server 102 may provide some or all of the functions of a push message service. Generally, the push message service provided by push server 102 is a service that enables electronic devices (including push server 102 itself) to communicate push messages to one another.

Push server 102 can use a network connection (e.g., an IP network connection) that is maintained using network 104 between UE 106 and push server 102 to send push messages from the push server 102 to the UE 106 and/or to receive reverse push messages sent from the UE 106 to the push server 102. Push messages can include graphics, sounds, and/or text, and can be used to deliver various messages to electronic devices (such as UE 106), e.g., news, stock quotes, weather forecasts, text messages, and/or notification of events such as email arrival, moves in a video game, etc.

In the described embodiments, UE 106 can receive a push message from the push server 102 and perform a corresponding action (e.g., display information/a message to a user, start/notify an application, etc.) and/or can send a push message to push server 102 for delivery to another electronic device (e.g., send a text message to a user of another electronic device, send a calendar update to a calendar application on a remote server, etc.) (for clarity, the other electronic device is not shown). Aside from the aspects herein described, push services are known in the art and hence are not described in detail.

Push Connection

In some embodiments, performing push message services may require that a push connection be established between the push server 102 and the UE device 106. The push connection may be a special connection that the device keeps open, e.g., to receive push notifications and FACE-TIME™ call invitations. The push connection may be established as a transmission control protocol (TCP) connection. Establishing a push connection may require a handshake procedure between the push server and the UE.

To maintain the connection, the push server may require that keep alive messages are periodically received from the UE during periods of times that do not contain active communications. In other words, if the push server does not receive a push message or a keep alive message from the UE after a predetermined period of time, the push server may terminate the push connection and reallocate network and other resources to other UE devices.

Successfully maintaining a connection (such as a push connection) may be complicated by one or more of the following factors. For example, the UE may move into an area with a weaker cellular signal or otherwise encounter disruptive interference. Further, some UEs (e.g., wearable devices, or other devices with a small form factor) may have a smaller antenna that results in interference or other conditions weakening a cellular signal more significantly than for a standard UE (e.g., a smartphone). A weak cellular signal may result in degraded performance or a loss of cellular connectivity, at least temporarily. In some embodiments, the UE may be capable of maintaining the connection by expending additional power while the UE is experiencing a weak signal, but it may be desirable for the UE to not expend additional power to keep the connection operative during a weak signal (e.g., to preserve battery life if the device has a limited battery due to a smaller form factor or other cause). Hence, under such circumstances, the UE may be unable to transmit and/or receive messages with the push server, and the connection may be lost.

In some embodiments, periodic loss of connectivity may result from a changing location of the UE. For example, a user may be in an environment where the UE periodically loses connectivity (e.g., at the top of a ski lift) and regains connectivity (e.g., at the bottom of a ski lift). Other examples are also possible, where a device periodically loses and regains connectivity. Regardless of the cause of the loss of connectivity, embodiments described herein provide techniques for gracefully handling (e.g., intermittent) connectivity loss.

Handling a loss of connectivity (e.g. for a TCP connection or a TCP push connection) gracefully may present challenges. For example, trying to operate on a degraded connection may involve retransmissions that fill buffers that will not get emptied. Eventually retransmissions may time out and the connection may die. Then, when connectivity is regained, a lengthy handshake procedure may be required to establish a new connection. Establishing a new connection with a push server can be inefficient, as all of the aspects of the connection must once again be established, which can require a significant amount of communication. Also, having to establish a new connection can further delay the communication of pending push messages.

Embodiments herein describe techniques for gracefully suspending a connection, by entering a suspended baseband state, to minimize the complexity of reestablishing the connection and to prevent having to establish a new connection.

Figure 5:
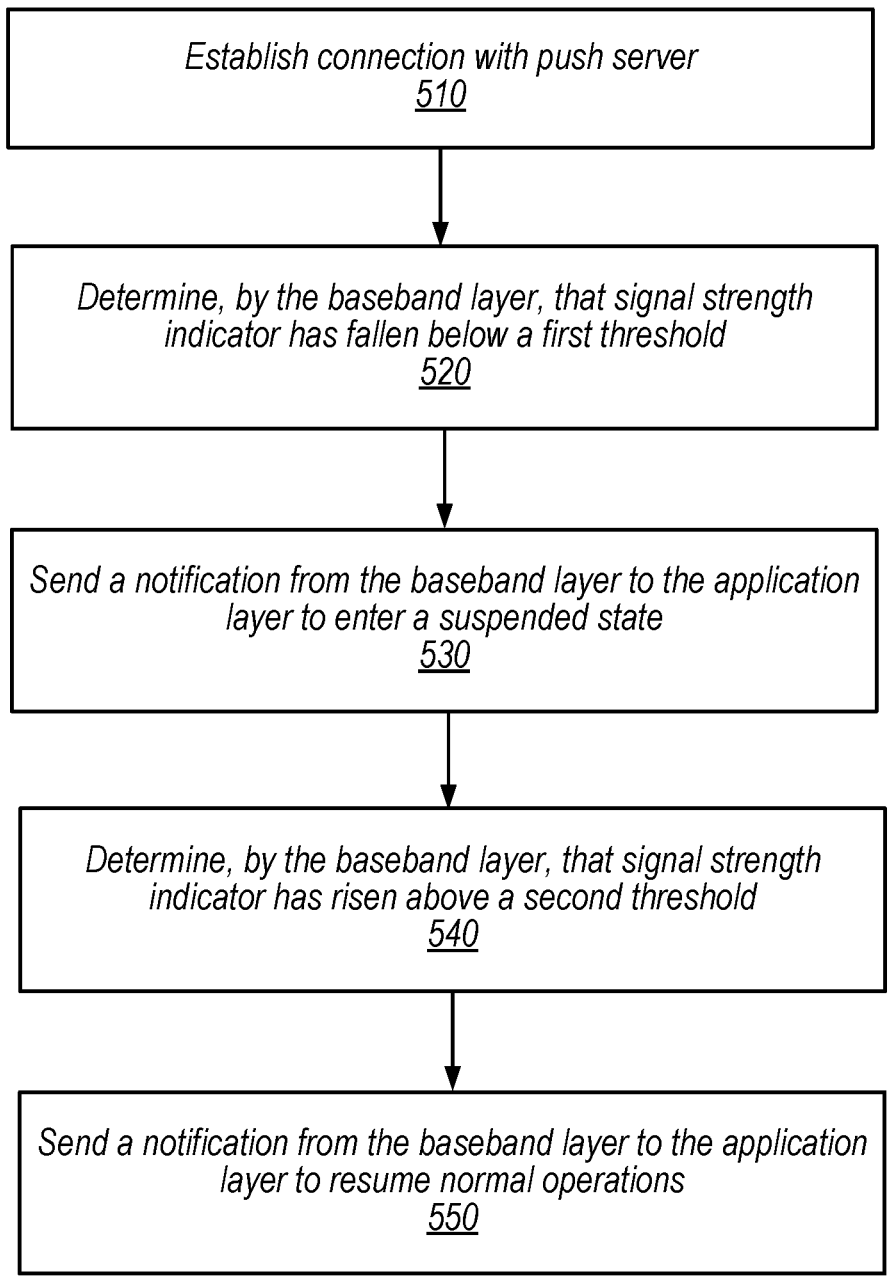
FIG. 5 is a flow chart diagram illustrating an exemplary method for entering and exiting a suspended baseband state, according to some embodiments.

FIG. 5—Suspended Baseband State

FIG. 5 is an example flowchart diagram illustrating a method for entering a suspended baseband state during an active push connection, according to some embodiments.

At 510, a push connection may be established between the UE 106 and a push server 102 through a network 104. In some embodiments, the connection may be a TCP connection. Additionally, in some embodiments, the application layer of the UE handles the push connection.

At 520, while the push connection is operational, the baseband (BB) layer may determine that a signal strength indicator of the push connection has fallen below a first threshold. Based on the signal strength indicator falling below the first threshold, the BB may determine that cellular connectivity may be disrupted, degraded, and/or become unreliable. For example, the BB may determine, e.g., that an error rate threshold may be exceeded, throughput may fall below a threshold, or the probability of a loss of cellular connectivity exceeds a threshold. In response to determining that the cellular connectivity (e.g., a cellular data connection) may become (or is becoming) disrupted, degraded, and/or unreliable, the BB layer may initiate steps to enter a suspended baseband state.

In some embodiments, the UE may determine to perform step 520 based on a location of a UE. For example, the UE may determine that it is in a location associated with intermittent interruptions of service (or intermittent reductions in signal strength). For example, as described above, some locations such as a ski resort or another location may be associated with intermittent service interruptions. In some embodiments, the UE may have a list of locations associated with intermittent service interruptions stored in memory. In these embodiments, if the UE determines that it is in a location associated with intermittent service interruptions, the UE may initiate step 520 (e.g., since an interruption in service may be anticipated or more likely in these locations).

In some embodiments, the UE may determine to initiate steps to enter a suspended baseband state based on other factors. For example, the UE may determine that the power cost for communicating using the push connection exceeds a predetermined threshold in current communication conditions. For example, a UE may be required to transmit data and messages with a higher transmission power if the strength of the connection is weak, and the UE may determine to enter a suspended baseband state rather than expend the excess energy required to effectively transmit data in weak radio conditions.

At 530, the BB layer may signal to one or more higher layers (e.g., the application layer), to enter a suspended state. In exemplary embodiments, the UE may opt out of automatic behavior to tear down the push connection during initiation of the suspended state. The UE may send a callback signal from the BB layer to the application push layer that allows the suspension of operations, so that the connection to the push server is not broken when it becomes unlikely that data can be successfully transmitted and/or received. For example, one or more messaging queues may be paused so that messages are not dequeued. Also, state information associated with the connection to the push server can be maintained. The suspended state may further include additional behavioral changes to the UE, as variously described below.

In some embodiments, in the suspended state, keep alive signaling may be suspended so timers don't fire to test the connection. In some embodiments, in the suspended state, signaling related to what types of push notifications the device wants to receive may be paused. For example, during an active push connection, the UE may send push filter updates to the push server that tell the push server what kind of notifications and messages the UE wants to receive. The UE may be further configured to send push token requests during a push connection, which specify implementation details of the push connection. During a suspended baseband state, one or more of message sending, keep alive signaling, push filter updates, and/or push token requests may be paused, since they may not be successfully transmitted. This may prevent filling buffers, unsuccessful transmission attempts, retransmission timeout, and/or connection failure.

The UE may be configured to reduce the functionality of the baseband layer to only receive emergency notifications from the server while in the suspended baseband state. In some embodiments, the baseband layer may be configured to only communicate data when WiFi is available while in a suspended baseband state.

Messages sent through a push connection may have a timeout wherein if a message in an outgoing message queue has not been successfully sent after a predetermined period of time, the message may be removed from the message queue and not sent. In some embodiments, the duration of this timeout may be increased while the UE is operating in a suspended baseband state.

The connection to the push server may remain idle in the suspended baseband state until connectivity is regained. For example, at 540, the baseband layer may determine that cellular connectivity has improved, e.g., based on a signal strength indicator rising above a second threshold. In some embodiments, the second threshold may be higher than the first threshold (e.g., leading to a hysteresis effect regarding the entrance and exit of the suspended state). Upon regaining reliably cellular connectivity, the UE can attempt to resume the connection with the push server. For example, if a NAT timer hasn't expired, when connectivity is regained, the UE may be able to resume the connection without having to initiate a handshake procedure. Accordingly, it may not be necessary to establish a new connection to push server and resources can be saved.

At 550, when the BB layer determines that connectivity has returned, the BB layer may send a notification to the application layer to resume normal operations. The UE may thereby reenter a normal state of operation, which may include resuming activities that were paused or suspended during the baseband state. In some embodiments, the UE may resume normal operations related to the push connection without having to establish a new push connection or perform a handshake procedure with the push server.

Reentering a normal state of operation may additionally involve testing the connection by sending a keep alive message, to determine if the connection is still active. For example, the push server may have tried to send traffic during the suspended baseband state and may have terminated the connection upon failing to receive a response. If the connection is not still active, the UE may initiate procedures to establish a new connection with the push server.

When a UE loses cellular service and then later rejoins a network, the UE may not be guaranteed to get the same IP address. It may be possible to resume a data connection, e.g., with a push server, only if the UE retains the same IP address used to initiate the connection. In some embodiments, the UE may be configured to request the same IP address when a cellular connection is restored, so that one or more data connections (e.g., including a connection with a push server) can be resumed instead of having the UE establish new connections.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
   by a user equipment device (UE) engaging in an active connection with a remote server:
   determining, by a baseband layer of the UE, that a signal strength indicator associated with the active connection has fallen below a first threshold;
   in response to determining that the signal strength indicator has fallen below the first threshold, transmitting, by the baseband layer to an application layer of the UE, a notification to suspend the connection, wherein the application layer is configured to cause the UE to suspend transmission of keep alive signaling to the remote server while the connection is suspended, and wherein state information associated with the connection is maintained by the UE while the connection is suspended;

while the connection is suspended, determining, by the
baseband layer, that the signal strength indicator has
risen above a second threshold; and
resuming the connection in response to the determination that the signal strength indicator has risen above the second threshold, wherein resuming the connection comprises sending a keep alive message to the remote server to determine if the connection is still active.

2. The method of claim 1,
wherein the method further comprises initiating procedures to establish a new connection with the remote server based on a determination that the connection is not still active.

3. The method of claim 1,
wherein resuming the connection comprises resuming communications with the remote server without reestablishing the connection.

4. The method of claim 1,
wherein, while the connection is suspended, the application layer is configured to suspend one or more of:
sending messages to buffers for transmission;
retransmitting failed transmissions;
transmitting filter updates to the remote server; or
transmitting token requests to the remote server.

5. The method of claim 1,
wherein the connection is a transmission control protocol (TCP) push connection.

6. The method of claim 1, the method further comprising:
employing a timeout procedure whereby messages in a message queue are removed from the message queue if the messages have not been successfully sent after a predetermined timeout duration, wherein the timeout duration is increased when the connection is suspended.

7. The method of claim 1, the method further comprising:
determining that the UE is in a location associated with intermittent reductions of signal strength,
wherein said determining that the signal strength indicator has fallen below the first threshold is performed in response to the determination that the UE is in the location associated with intermittent reductions of signal strength.

8. A user equipment device (UE), comprising:
a radio;
a baseband processor (BB) operatively coupled to the radio; and
an application processor (AP) operatively coupled to the BB;
wherein the UE is configured to:
engage in an active connection with a remote server;
determine, by the BB, that a signal strength indicator associated with the active connection has fallen below a first threshold;
in response to determining that the signal strength indicator has fallen below the first threshold, transmit, by the BB to the AP, a notification to suspend the connection, wherein the AP is configured to cause the UE to suspend transmission of keep alive signaling to the remote server while the connection is suspended, and wherein state information associated with the connection is maintained by the UE while the connection is suspended;
while the connection is suspended, determine, by the BB, that the signal strength indicator has risen above a second threshold; and
resume the connection in response to the determination that the signal strength indicator has risen above the second threshold, wherein resuming the connection comprises sending a keep alive message to the remote server to determine if the connection is still active.

9. The UE of claim 8, wherein the UE is further configured to:
initiate procedures to establish a new connection with the remote server based on a determination that the connection is not still active.

10. The UE of claim 8, wherein the UE is further configured to:
while resuming the connection, request a same IP address that was used to initiate the connection.

11. The UE of claim 8, wherein the UE is further configured to:
determine that the UE is in a location associated with intermittent reductions of signal strength,
wherein said determining that the signal strength indicator has fallen below the first threshold is performed in response to the determination that the UE is in the location associated with intermittent reductions of signal strength.

12. The UE of claim 8,
wherein, while the connection is suspended, the AP is configured to suspend one or more of:
sending messages to buffers for transmission;
retransmitting failed transmissions;
transmitting filter updates to the remote server; or
transmitting token requests to the remote server.

13. The UE of claim 8, wherein the UE is further configured to:
employ a timeout procedure whereby messages in a message queue are removed from the message queue if the messages have not been successfully sent after a predetermined timeout duration, wherein the timeout duration is increased when the connection is suspended.

14. The UE of claim 8,
wherein the connection is a transmission control protocol (TCP) push connection.

15. A non-transitory computer-readable memory medium that stores program instructions that, when executed by a processor of a user equipment device (UE), cause the UE to:
engage in an active connection with a remote server;
determine, by a baseband layer of the UE, that a signal strength indicator associated with the active connection has fallen below a first threshold;
in response to determining that the signal strength indicator has fallen below the first threshold, transmit, by the baseband layer to an application layer of the UE, a notification to suspend the connection, wherein, while the connection is suspended, transmission by the UE of keep alive signaling to the remote server is suspended by the application layer, and wherein state information associated with the connection is maintained by the UE while the connection is suspended;
while the connection is suspended, determine, by the baseband layer, that the signal strength indicator has risen above a second threshold;
resume the connection in response to the determination that the signal strength indicator has risen above the second threshold; and
while resuming the connection, send a keep alive message to the remote server to determine if the connection is still active.

16. The non-transitory computer-readable memory medium of claim 15, wherein the program instructions are further executable to cause the UE to:
  initiate procedures to establish a new connection with the remote server based on a determination that the connection is not still active.

17. The non-transitory computer-readable memory medium of claim 15, wherein the program instructions are further executable to cause the UE to:
  while resuming the connection, request a same IP address that was used to initiate the connection.

18. The non-transitory computer-readable memory medium of claim 15,
  wherein, while the connection is suspended, the program instructions are further executable to cause the application layer to suspend one or more of:
    sending messages to buffers for transmission;
    retransmitting failed transmissions;
    transmitting filter updates to the remote server; or
    transmitting token requests to the remote server.

19. The non-transitory computer-readable memory medium of claim 15, wherein the program instructions are further executable to cause the UE to:
  employ a timeout procedure whereby messages in a message queue are removed from the message queue if the messages have not been successfully sent after a predetermined timeout duration, wherein the timeout duration is increased when the connection is suspended.

20. The non-transitory computer-readable memory medium of claim 15, wherein the program instructions are further executable to cause the UE to:
  determine that the UE is in a location associated with intermittent reductions of signal strength,
  wherein said determining that the signal strength indicator has fallen below the first threshold is performed in response to the determination that the UE is in the location associated with intermittent reductions of signal strength.

* * * * *